J. B. SINDERSON.
MILLING MACHINE.
APPLICATION FILED SEPT. 9, 1913.
1,188,339.
Patented June 20, 1916.
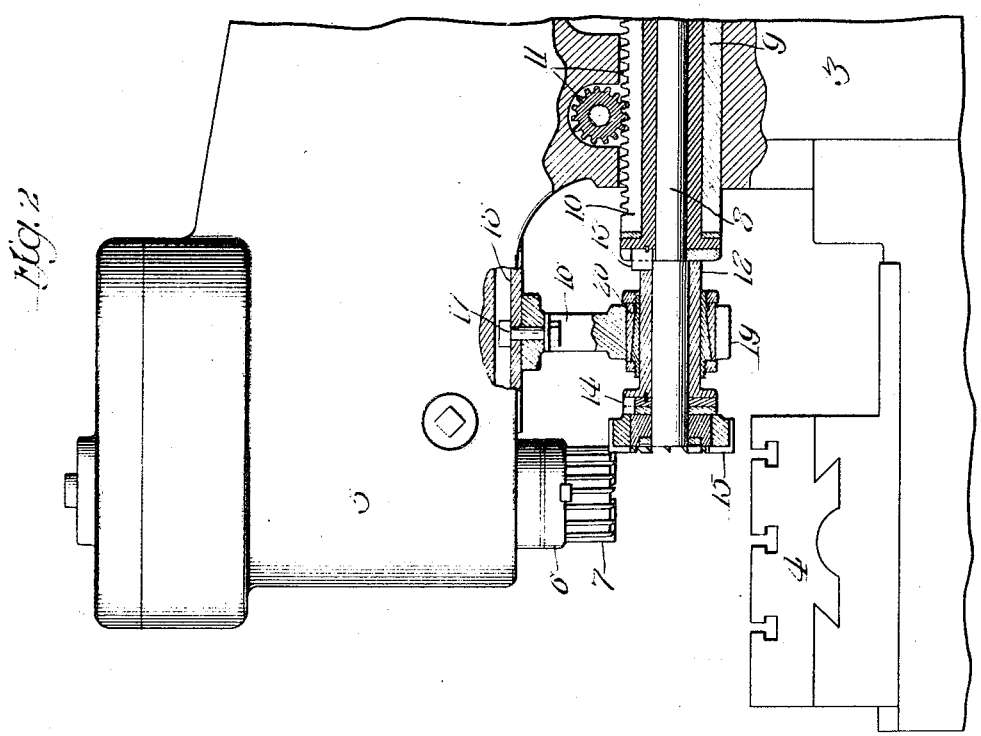
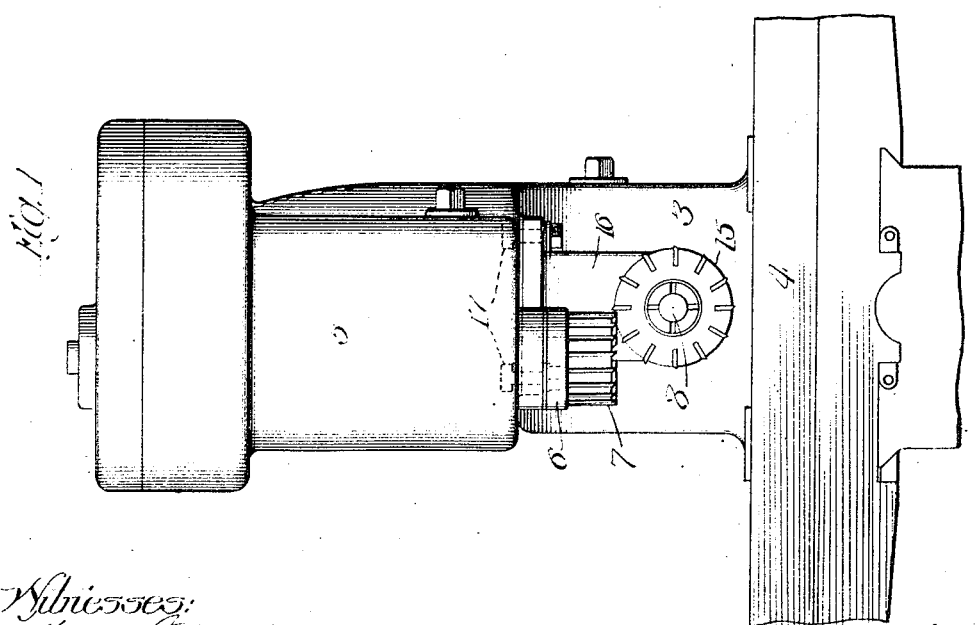
Witnesses:
Harold E. Bartlett
John F. McCarragh
Inventor
John B. Sinderson
By A. O. Behel
Atty.

UNITED STATES PATENT OFFICE.

JOHN B. SINDERSON, OF ROCKFORD, ILLINOIS, ASSIGNOR TO THE INGERSOLL MILLING MACHINE COMPANY, OF ROCKFORD, ILLINOIS, A CORPORATION OF ILLINOIS.

MILLING-MACHINE.

1,188,339.  Specification of Letters Patent.  Patented June 20, 1916.

Application filed September 9, 1913. Serial No. 788,867.

*To all whom it may concern:*

Be it known that I, JOHN B. SINDERSON, a citizen of the United States, residing at Rockford, in the county of Winnebago and State of Illinois, have invented certain new and useful Improvements in Milling-Machines, of which the following is a specification.

This invention relates in general to milling machines and has more particular reference to those of the knee-type in which the frame is shaped to provide an overhanging or projecting head for supporting a vertical cutter-holding spindle in addition to the customary horizontal spindle journaled in the upright portion or frame proper of a milling machine.

The primary object of my invention is to provide a milling machine in which an angular face or a sharp corner may be milled in one operation by a pair of face milling cutters each of which shall mill a surface of a width substantially equal to its face diameter. To this end I have journaled a horizontal and a vertical cutter-holding spindle in the frame proper and projecting head, respectively, of a milling machine of the knee-type in such manner that the cutter-holding or outer ends of the spindles are adjacently disposed and the axes of the spindles are offset or out of alinement so that the cutting planes of face plate milling cutters attached to the spindle will overlap. With such an arrangement of cutters, corner milling may be effected in one operation so as to obtain a sharp corner, the milled surfaces thereof being of a width substantially equal to the diameter of the face cutters.

Another object of my invention is to provide in a milling machine of the knee-type having a pair of cutter-holding spindles arranged in offset relation as and for the purpose described, means whereby corner face milling may be effected at a substantial distance from the upright frame or frame proper of the machine, and to materialize this object by the provision of a journal bracket secured to the overhanging or projecting head of the frame so as to provide a rigid journal or brace for the horizontal spindle intermediate its cutter-holding end and its mounting in the frame proper and to permit the work table and work thereon to extend beneath said spindle.

In the accompanying drawings: Figure 1, is a front elevation of a portion of a milling machine of the knee-type embodying my improvements. Fig. 2, is a side elevation of Fig. 1, the horizontal spindle being shown in vertical section.

The milling machine illustrated in the drawings is of the knee-type having both a vertical and horizontal cutter spindle, and since the manner of driving the cutter-holding spindles is well known in the art and since my present invention does not relate to the form of driving means I have deemed it unnecessary to illustrate or describe means for rotating the said spindles.

The milling machine body 3, has a work carrying table 4 mounted movable thereupon, and has a spindle housing 5 disposed above and over-reaching the table 4. A spindle 6, is mounted on a vertical axis in the housing 5, carries a face milling cutter 7, and may be suitably rotated and adjusted vertically as is well understood in the art. The horizontal spindle is shown in section in Fig. 2, and as is clearly seen from Fig. 1, is mounted on a horizontal axis which is offset with respect to or out of alinement with the vertical spindle axis. The spindle proper 8 has a bearing sleeve 9 rotatable therewith and journaled in the sleeve 10 which is mounted slidable longitudinally in the body 3, this movement being controlled by the rack and pinion 11. An extension sleeve 12 upon the spindle has a key connection 13 with sleeve 9 and has a key connection 14 at its opposite end with a face milling cutter 15 carried by the spindle. A spindle journal support or bracket 16 is secured to face ways on the under side of housing 5 by bolts 17 which have a head located in slots 18 formed parallel with the axis of spindle 8, said support providing a journal head 19 at its lower end in which is journaled the shank portion of the horizontal spindle or that portion intermediate the milling cutter and its driven portion mounted in the machine body.

An adjustable split sleeve 20 is interposed between the head 19 and sleeve 12 providing a take up means for wear.

To make a corner cut with milling cutters in one operation, that is to face the two angle sides adjacent a corner leaving the corner sharp, it is necessary that the cutting faces of each cutter overlap or extend beyond and into the cutting plane of the other cutter. It will be noticed from Fig. 2, that the cutting face of each cutter extends into the cutting plane of the other cutter, thus allowing face milling of two adjoining angle sides to effect a sharp corner cut. This is enabled through the offset of the cutter spindle axes in separate planes as above described, thus allowing with but a single operation or feed of work past the cutters, to secure a sharp corner cut with both sides of the corner faced or milled a width substantially equal to the diameter of its face cutter.

To make such a cut as would be enabled by the position of the cutters shown in the drawings it is necessary, because of the extended distance of the cutter holding end of spindle 8 from its mounting in the machine body, to support and steady said end; otherwise such cutting would be very impractical. By utilizing my improved spindle supporting means rigidly carried by the machine housing and bracing the spindle intermediate its cutter holding end and its driven end mounted in the machine body, a very substantial and rigid support of said spindle is effected. This allows said spindle to operate without vibrating or chattering and to thus obtain perfect milling. It will be noticed that the support 16 is carried at all times rigid with its head in a positive relation with the spindle to hold the same rigidly and braced against axial displacement, and that upon adjustment of said support longitudinally upon its ways it is always maintained in the same operative relation to the spindle.

I claim as my invention:

1. A milling machine comprising a knee-type frame, a work table disposed beneath the projecting head of the frame, a horizontal cutter-holding spindle journaled in the frame proper and a vertical spindle journaled in the projecting head thereof, the vertical planes of the axes of the vertical and of the horizontal spindles, respectively, being offset one from the other, the cutter-holding ends of said spindles being disposed in such proximity that the cutting planes of face plate milling cutters mounted on the spindles overlap, so that work mounted on the table may be corner face milled in one operation.

2. In a milling machine, the combination of a frame, a vertical and a horizontal cutter-holding spindle mounted thereon, a face plate milling cutter attached to the end of each spindle, the vertical planes of the axes of the vertical and of the horizontal spindles, respectively, being offset one from the other, so that the faces of their cutters overlap whereby to mill in one operation a right angle corner, the milled surfaces of which will be of a width substantially equal to the diameters of the cutters.

In testimony whereof I have hereunto set my hand in presence of two subscribing witnesses.

JOHN B. SINDERSON.

Witnesses:
 JOHN F. McCANNA, Jr.,
 E. D. E. N. BEHEL.